(12) United States Patent
Davis et al.

(10) Patent No.: US 7,124,409 B2
(45) Date of Patent: *Oct. 17, 2006

(54) AUTOMATIC SOFTWARE INSTALLATION ON HETEROGENEOUS NETWORKED COMPUTER SYSTEMS

(75) Inventors: Michael L. Davis, Carnation, WA (US); Raymond W. McCollum, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 751 days.

This patent is subject to a terminal disclaimer.

(21) Appl. No.: 09/916,866

(22) Filed: Jul. 27, 2001

(65) Prior Publication Data

US 2002/0002704 A1 Jan. 3, 2002

Related U.S. Application Data (63) Continuation of application No. 09/397,480, filed on Sep. 16, 1999, now Pat. No. 6,282,712, which is a continuation of application No. 08/403,244, filed on Mar. 10, 1995, now abandoned.

(51) Int. Cl.
*G06F 9/445* (2006.01)
(52) U.S. Cl. .................................... 717/178
(58) Field of Classification Search ........ 717/168–178; 710/8; 709/220–222; 713/100
See application file for complete search history.

(56) References Cited

U.S. PATENT DOCUMENTS

| | | | | |
|---|---|---|---|---|
| 4,558,413 A | | 12/1985 | Schmidt et al. ............. 364/300 |
| 4,714,995 A | * | 12/1987 | Materna et al. ............. 707/201 |
| 4,788,637 A | | 11/1988 | Tamaru ..................... 364/200 |
| 4,891,785 A | | 1/1990 | Donohoo .................... 364/900 |
| 4,953,162 A | * | 8/1990 | Lyons et al. ................ 370/245 |
| 5,005,122 A | * | 4/1991 | Griffin et al. ............... 709/203 |
| 5,184,312 A | | 2/1993 | Ellis ......................... 702/121 |
| 5,317,568 A | | 5/1994 | Boxby et al. ............... 370/856 |
| 5,341,478 A | * | 8/1994 | Travis et al. ............... 709/203 |
| 5,359,730 A | * | 10/1994 | Marron ...................... 717/169 |
| 5,367,686 A | | 11/1994 | Fisher et al. ............... 395/700 |
| 5,371,858 A | * | 12/1994 | Miller et al. ............... 709/222 |
| 5,421,009 A | | 5/1995 | Platt ......................... 395/600 |
| 5,428,772 A | | 6/1995 | Merz ........................ 395/600 |

(Continued)

OTHER PUBLICATIONS

Digital Equipment Corporation, "*Polycenter Software Installation Utility User's Guide*", Digital Equipment Co., pp. i-xi, 1.1-1.3, 2.1-2.10, 3.1-3.3, 4.1-4.7, 5.1-5.6, 6.1, c.8-c.19, Mar. 1994.

(Continued)

*Primary Examiner*—Kakali Chaki
*Assistant Examiner*—Trenton J. Roche
(74) *Attorney, Agent, or Firm*—Workman Nydegger (57) ABSTRACT

The present invention provides for automatically installing software on heterogeneous computer systems. In a distributed system having heterogeneous computer systems having dissimilar hardware or software components or dissimilar configuration information, such as different natural languages, different operating system types, different network operating system types, and different processor types, the present invention automatically installs the appropriate edition of software on computers. The present invention installs an edition of software appropriate for use with a specific operating system type, appropriate for execution on a particular processor type and in a particular natural language by utilizing commands specific to an operating system and network operating system type. The present invention automatically installs software in response to user input, the addition of a new computer to the distributed system, or upon the availability of a new version of the software.

33 Claims, 7 Drawing Sheets

U.S. PATENT DOCUMENTS

| | | | |
|---|---|---|---|
| 5,442,791 A * | 8/1995 | Wrabetz et al. | 719/330 |
| 5,450,582 A * | 9/1995 | Nakajima et al. | 707/10 |
| 5,473,772 A | 12/1995 | Halliwell et al. | 295/650 |
| 5,485,370 A | 1/1996 | Moss et al. | 364/408 |
| 5,497,460 A * | 3/1996 | Bailey et al. | 714/39 |
| 5,499,357 A | 3/1996 | Sonty et al. | 395/500 |
| 5,524,253 A | 6/1996 | Pham et al. | 395/800 |
| 5,596,723 A * | 1/1997 | Romohr | 709/222 |
| 5,600,797 A * | 2/1997 | Marshall | 709/224 |
| 5,630,076 A * | 5/1997 | Saulpaugh et al. | 710/104 |
| 5,699,351 A * | 12/1997 | Gregerson et al. | 370/256 |
| 5,717,930 A | 2/1998 | Imai et al. | 717/11 |
| 5,742,829 A | 4/1998 | Davis et al. | 717/11 |
| 5,758,342 A | 5/1998 | Gregerson | 707/10 |
| 5,794,052 A | 8/1998 | Harding | 717/11 |
| 5,802,286 A * | 9/1998 | Dere et al. | 709/220 |
| 6,119,186 A * | 9/2000 | Watts et al. | 710/104 |
| 6,209,089 B1 * | 3/2001 | Selitrennikoff et al. | 713/2 |
| 6,286,041 B1 * | 9/2001 | Collins et al. | 709/221 |
| 6,678,888 B1 * | 1/2004 | Sakanishi | 717/172 |

OTHER PUBLICATIONS

Lasan et al., "*A natural-language interface to a constraint satisfaction system*", IEEE, Formal Methods in HCI: III, IEE Colloquium on, pp. 6/1-6/8, 1989.

* cited by examiner

FIG. 6

AUTOMATIC SOFTWARE INSTALLATION ON HETEROGENEOUS NETWORKED COMPUTER SYSTEMS

CROSS-REFERENCE TO RELATED APPLICATIONS

This patent application is a continuation patent application of U.S. patent application Ser. No. 09/397,480 entitled "Automatic Software Installation on Heterogeneous Networked Computer Systems, " filed Sep. 16, 1999 now U.S. Pat. No. 6,282,712 which is a continuation patent application of U.S. patent application Ser. No. 08/403,244, entitled "Automatic Software Installation on Heterogeneous Networked Computer Systems," filed Mar. 10, 1995 now abandoned, the disclosures of which are incorporated by their entirety herein by this reference.

BACKGROUND OF THE INVENTION

1. The Field of the Invention

The present invention relates generally to data processing systems and, more particularly, to the automatic installation of software on heterogeneous computer systems.

2. The Relevant Technology

Typically, large, multinational corporations have a distributed system containing many computers spread across a wide geographical area that are networked together. This type of environment makes it difficult and costly to manage the computers in terms of providing software installation, support and maintenance. That is, an administrator of the distributed system has to visit each computer in order to manage the computers. Thus, a significant cost of managing the computers in this type of environment stems from software installation, support, and maintenance. In fact, the initial purchase price of software may be only a small portion of the total cost associated with managing the computers.

The distributed Systems of large corporations usually comprise computers that have dissimilar hardware and software components. The lack of uniformity in components is the product of different organizations within the corporation having different needs for their computers. For instance, one organization may consist primarily of clerical workers, who utilize various programs such as word processing programs or spreadsheet programs, that do not require significant processing power, whereas another organization in the corporation that performs engineering research utilize more computationally intensive programs that require significantly more processing power. Therefore, a large corporation usually has computers with different types of processors.

With respect to different software components, the distributed systems of large corporations usually contain groups of computers that are interconnected via a local area network (LAN). Each group of computers typically represents an organization within the corporation. Each group of computers contains one or more server computers that runs a network operating system. A "network operating system" provides network services to other computers ("client computers") on the LAN, such as remote file access as well as remote printing capabilities. In many instances, different groups may have servers running different network operating systems.

The client computers within a group of computers are typically used by end users. End users often have preferences regarding what operating system runs on their computer. Therefore, in a distributed system of a large corporation having many end users, there are usually a number of computers with different operating systems.

Just as end users have a preference for a particular operating system, end users typically have a preference for a natural language in which communications between the end user and the computer are to take place. In a distributed system of a large, multinational corporation, it is common to have computers that employ different natural languages for communications with end users.

Systems have been developed that, upon user initiation, install software from a master computer to a slave computer, where both the master and the slave are homogeneous with respect to each other in that they have similar hardware and software components. However, these systems typically do not operate within a distributed system of computers that have dissimilar hardware and software components, such as is commonly found with large corporations. Therefore, although systems have been developed to facilitate the installation of software on homogenous computers, these Systems do not Suit the needs of a large corporation. Thus, large corporations and other organizations having a distributed system of heterogeneous computers are in need of a mechanism to facilitate the installation of software within their distributed system.

BRIEF SUMMARY OF THE INVENTION

The system described herein provides for automatically installing software on heterogeneous networked computer systems. In a distributed system having heterogeneous computer systems of different natural languages, different operating system types, different network operating system types, or different processor types, the system described herein automatically installs the appropriate edition of software on computers. The system described herein installs an edition of software appropriate for execution on a particular processor type, suitable for use with a particular operating system and in a particular natural language by the system utilizing commands specific to an operating system and network operating system type. The system described herein automatically installs software in response to user input, the addition of a new computer to the distributed system, or upon the availability of a new version of the software.

In accordance with a first aspect of the present invention, a method is provided for automatically installing software in a distributed system having a first computer and a second computer. The first computer includes an installation component and the second computer is heterogeneous with respect to the first computer. The installation component automatically determines when to install the software on the second computer and when it is determined to install the software, the installation component installs the software on the second computer.

A second aspect of the present invention discloses an automatic software installation system. The automatic software installation system has a first computer and a second computer. The first computer has an associated natural language and a processor running an operating system. The second computer has a first component for storing editions of software, a second component for determining the natural language of the first computer, the operating system of the first computer and the processor of the first computer, and a third component for installing an edition of the software onto the first computer that is suitable for execution on the processor of the first computer and that utilizes the natural language of the first computer, wherein the second computer installs the edition of the software by utilizing commands that are suitable for the operating system of the first computer.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

A preferred embodiment of the present invention automatically installs software in a heterogeneous environment. A "heterogeneous environment" refers to a grouping of computers usually connected via a network, where some of the computers have dissimilar hardware or software components or dissimilar configuration information, including different types of operating systems, different types of network operating systems, different natural languages, or different types of processors. By automatically installing software in a heterogeneous environment, the preferred embodiment facilitates the maintenance of computers in a heterogeneous environment and reduces the cost associated therewith. Two computers are said to be "heterogeneous" with respect to each other if they have dissimilar hardware or software components or dissimilar configuration information. For example, two computers are considered heterogeneous if they access network services through different network operating systems or if they have different operating systems, natural languages or processors.

The preferred embodiment of the present invention operates within the context of a centralized management system for distributed systems, such as the Systems Management Server available from Microsoft Corporation of Redmond, Wash., although one skilled in the art will appreciate that other embodiments of the present invention can operate in other types of systems. The centralized management system provides hardware and software inventory support, software distribution and installation, software updates, and remote diagnostics. In providing hardware and software inventory support, the centralized management system provides a listing of the hardware and software components on the computers in the distributed system. In providing software distribution and installation, the centralized management system centralizes the distribution and installation of application programs on file servers or clients of the file servers. The software update functionality performed by the centralized management system installs new software versions when the current version of the software becomes outdated. The installation of the new version of software is performed on each computer that needs the new version. A "version" of software refers to the release of the software, which is typically indicated by a number, such as 1.0. In providing the remote diagnostics functionality, the centralized management system allows an administrator of the distributed system to take control of the input devices and the display of a remote computer so as to be able to diagnose problems with the computer.

As previously stated, the preferred embodiment operates in a heterogeneous environment. The computers that operate in this type of environment can have different natural languages, network operating systems, operating systems, or processors. With respect to natural languages, for purposes of explaining the preferred embodiment, an illustrative case is described below using English and German, although the present invention can be used with other natural languages. As to the different network operating systems, the preferred embodiment supports the "MICROSOFT WINDOWS NT" network operating system available from Microsoft Corporation of Redmond, Wash., the "LAN MANAGER" network operating system also available from Microsoft Corporation and the "LAN SERVER" network operating system available from the International Business Machines Corporation of Armonk, N.Y. The operating systems supported by the preferred embodiment include "MICROSOFT WINDOWS NT," Microsoft Operating System 2 available from Microsoft Corporation and IBM "OS/2" available from the IBM Corporation. "MICROSOFT WINDOWS NT" operates as both a network operating system by providing access to remote resources such as printers and files, as well as a local operating system by providing access to local resources. The processors supported by the preferred embodiment include the X86 family of processors available from the Intel Corporation of Cupertino, Calif., the MIPS R4000 family of processors available from MIPS Technologies of Mountain View, Calif. and the Alpha family of processors available from the Digital Equipment Corporation of Maynard, Mass. The various combinations of network operating systems, operating systems and processors supported by the preferred embodiment are depicted below in Table 1.

TABLE 1

| Network Operating System | Windows NT | LAN Manager | LAN Server |
|---|---|---|---|
| Operating System | Windows NT | MS OS/2 | IBM OS/2 |
| Processor | Intel X86<br>DEC Alpha<br>MIPS R4000 | Intel X86 | Intel X86 |

As can be seen from the above table, the preferred embodiment supports a computer running "MICROSOFT WINDOWS NT" on the X86, Alpha or MIPS families of processors. Also, the preferred embodiment supports a computer running "LAN MANAGER" and MS OS/2 on the Intel X86 family of processors and a computer running "LAN SERVER" and IBM OS/2 on the Intel X86 family of processors. One skilled in the art will appreciate that the present invention can be used with other network operating systems, operating systems and processors or additional combinations thereof.

Figure 1:
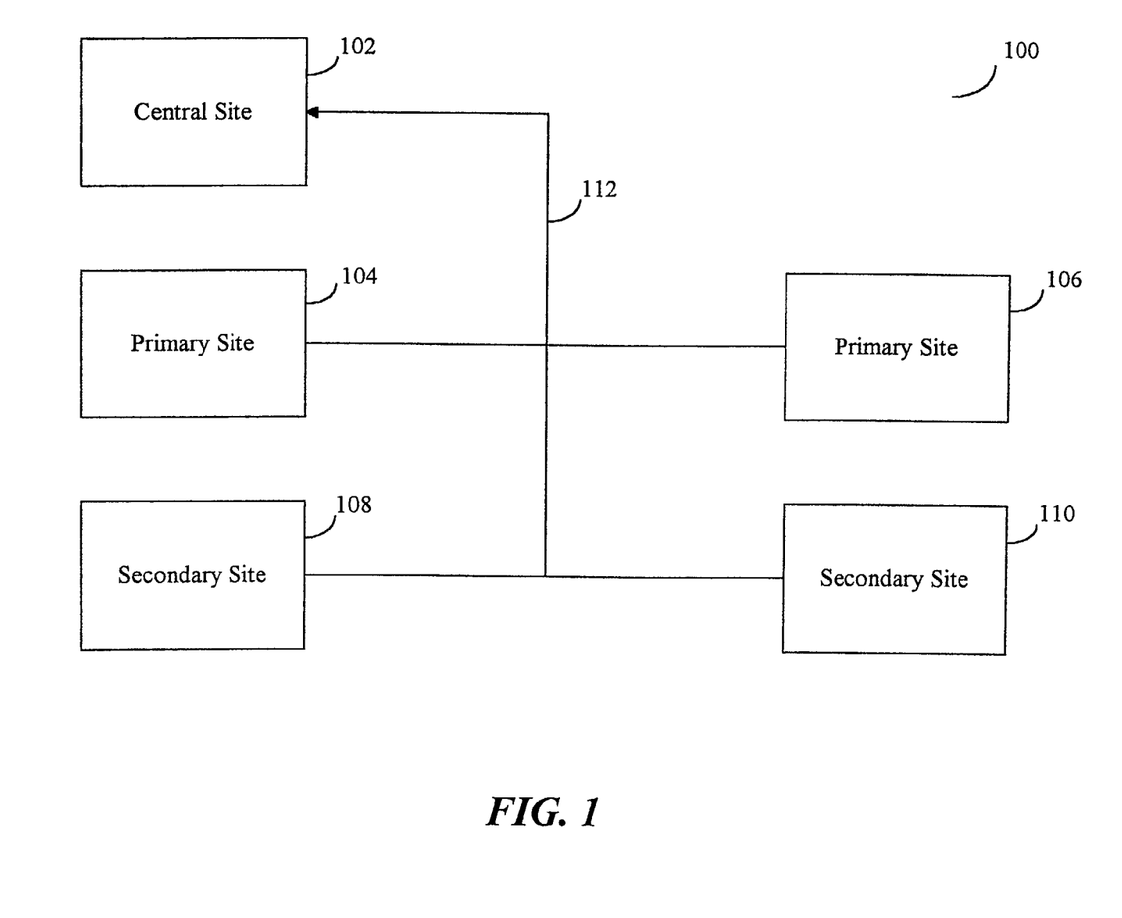
FIG. 1 depicts a distributed system suitable for practicing a preferred embodiment of the present invention.

The centralized management system in which the preferred embodiment operates is used to control a distributed system having many sites, where each site has a local area network connecting a number of computers. One of these sites acts as the central site for managing all of the other Sites. The other Sites consist of primary sites and secondary sites and may be ordered hierarchically with the primary sites being responsible for managing the secondary sites. A block diagram of the distributed system in which the preferred embodiment operates is depicted in FIG. 1. The distributed system 100 contains a central site 102, two primary sites 104, 106 and two secondary sites 108, 110 with each site connected to communication mechanism 112, such as a wide area network. The central site 102 manages all other sites and therefore stores system-wide information. The primary sites 104, 106 typically manage one or more secondary sites 108, 10. For example, the primary site 104 may manage secondary site 108 and the primary site 106 may manage secondary site 110. As stated previously, the sites are arranged hierarchically with the central site at the top of the hierarchy managing all other sites and the primary sites are next in the hierarchy managing the secondary sites.

Figure 2:
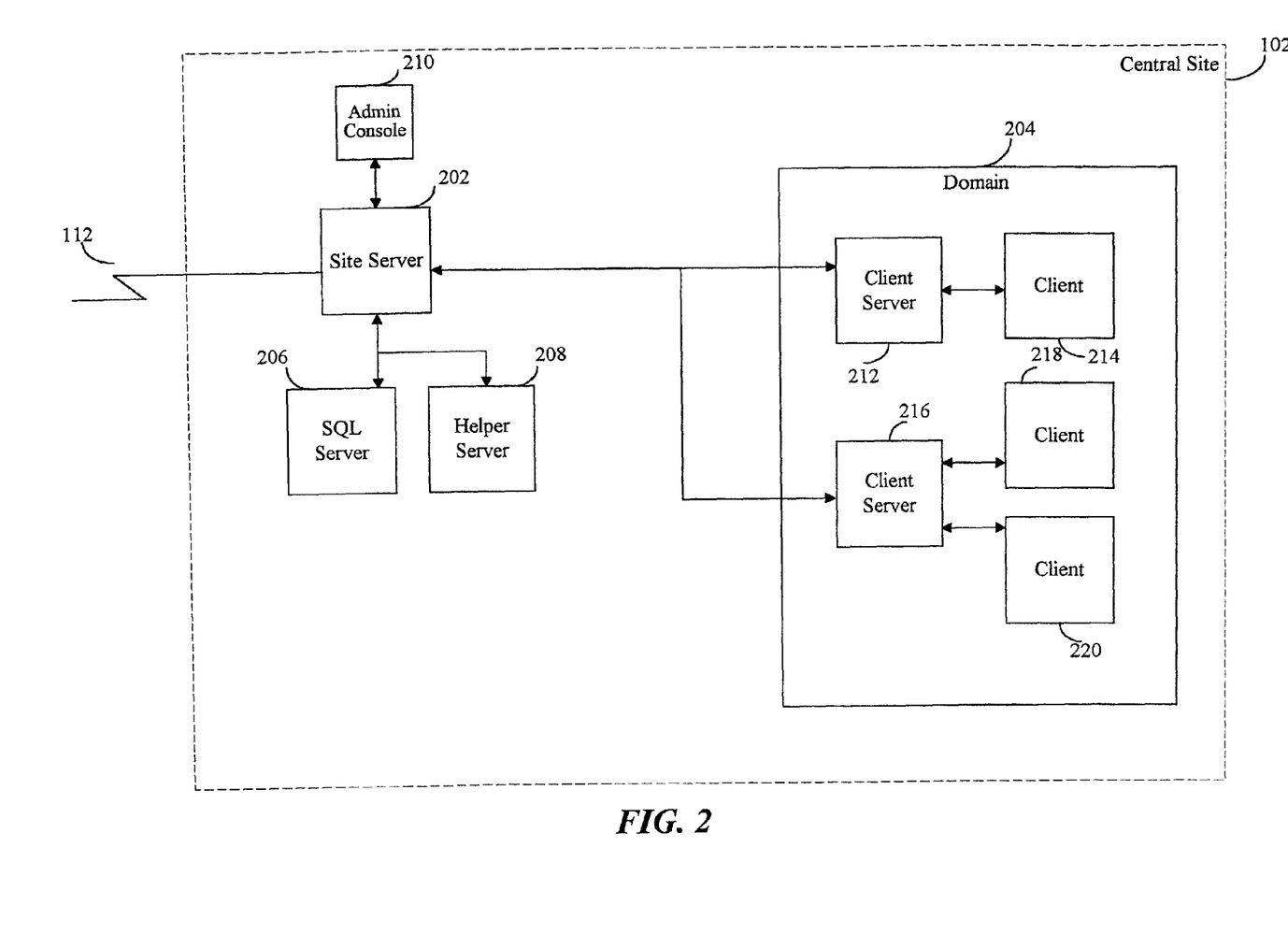
FIG. 2 depicts a more detailed diagram of the central site of FIG. 1.

A more detailed block diagram of the central site of FIG. 1 is depicted in FIG. 2. The central site 102 is connected to one or more primary sites via the communication mechanism 112. The central site 200 contains a site server 202, an SQL server 206, a helper server 208, and a domain 204. The site server 202 of the central site 102 acts as the centralized management system for the central site and all other sites. An administrator's console 210 is connected to the site server 202 so that the administrator can centrally manage the distributed system. In addition, the site server 202 stores software that can be installed on other computers in the distributed system. The SQL server 206 manages a database that contains various inventory information and status information regarding the distributed system. The helper server 208 is used to offload some of the burden of managing the distributed system from the site server 202. The domain 204 is a grouping of computers and contains two client servers 212 and 216, which are connected to client computers 214, 218, and 220. The client servers 212 and 216 act as file servers for the client computers 214, 218, and 220, which are, in turn, used by end users. Although the central site has been described as having various components, one skilled in the art will appreciate that the central site can contain additional or different components such as additional helper servers, additional domains, additional client servers within a domain, and additional clients for each client server.

Primary and secondary Sites are configured like the central site except that the secondary sites do not contain SQL servers. Therefore, both primary sites and secondary sites usually contain a site server, one or more helper servers, as well as one or more domains and the primary sites additionally contain an SQL server. Each domain may contain one or more client servers connected to one or more clients. The site server for a primary site is used for managing the primary site in which it is located as well as all secondary sites that are lower in the hierarchy. However, the site server of the central site acts as the centralized management mechanism of the entire distributed system, thereby managing all sites.

Figure 3A:
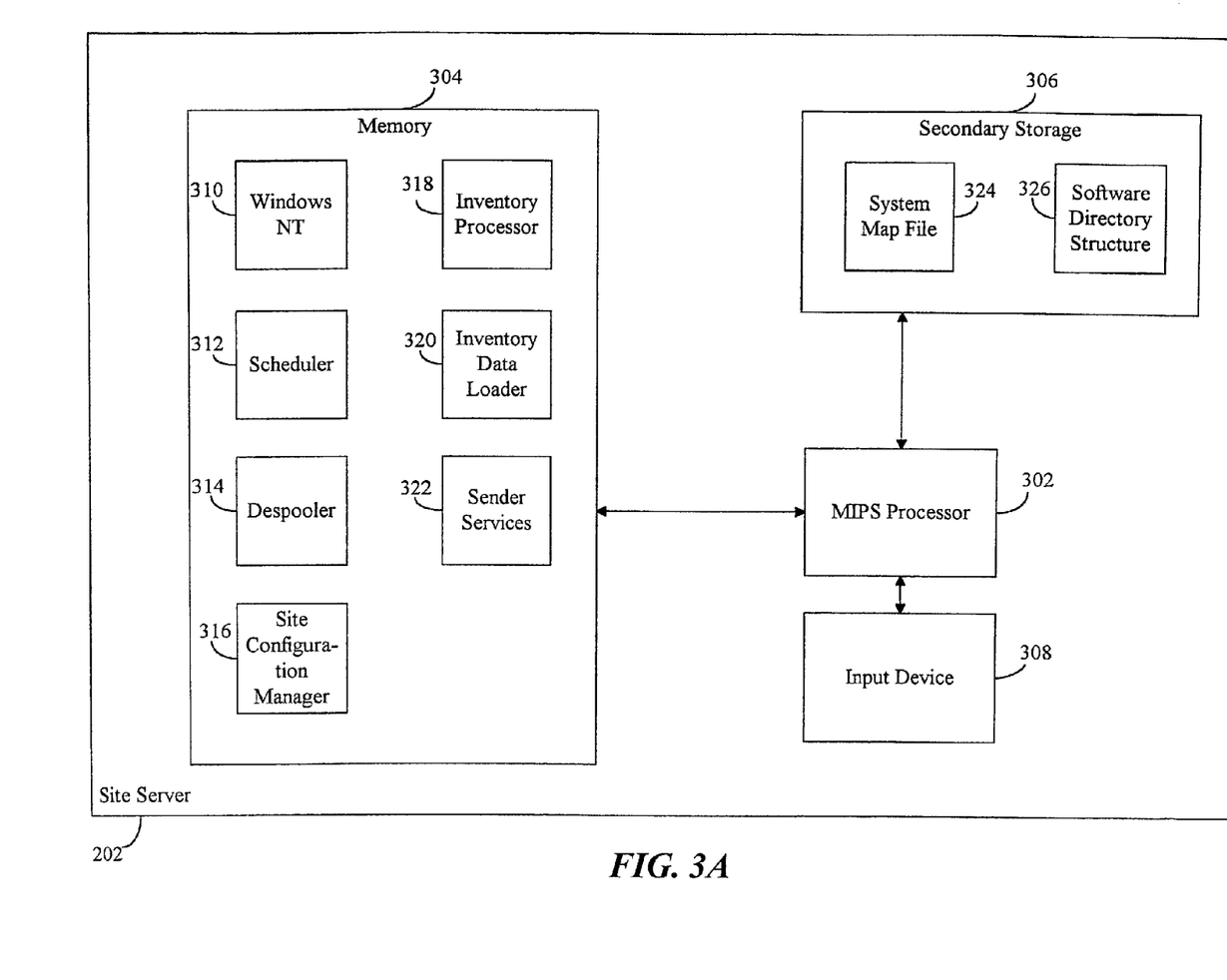
FIG. 3A depicts a more detailed block diagram of a site server of FIG. 2.

FIG. 3A depicts a more detailed block diagram of the site server 202 of FIG. 2. The site server 202 contains a central processing unit (CPU) 302, a memory 304, a secondary storage device 306, such as a hard disk, and an input device 308, such as a keyboard. Although the site server 202 is described with respect to having specific components, one skilled in the art will appreciate that the site server may have additional or different components. For example, the site server 202 can utilize a CPU such as an X86, MIPS, or Alpha CPU. The memory 304 contains a copy of "MICROSOFT WINDOWS NT" 310, a number of services 312, 314, 318, 320, 322 that provide the functionality of the centralized management system, and a site configuration manager 316 that performs the functionality of the preferred embodiment of the present invention, as will be further described below. Additionally, the site configuration manager performs processing associated with client computers as described in copending U.S. Pat. No. 5,742,829 entitled "Automatic Software Installation on Heterogeneous Networked Client Computer Systems," which is hereby incorporated by reference. "MICROSOFT WINDOWS NT" 310 acts as both a network operating system and a local operating system to the site server. A "service" is a computer program that typically runs as a background task and performs a system function, such as a function related to the centralized management system described herein. The services that provide the functionality of the centralized management system include the scheduler 312, the despooler 314, the inventory processor 318, the inventory data loader 320, and the sender services 322. The scheduler 312 is responsible for scheduling jobs such as software updates to occur across the distributed system and when the time has arrived for the job to be performed, the despooler 314 is responsible for performing the job by distributing the software to one or more computers within the site. The inventory processor 318 is responsible for receiving inventory information from the computers within a domain and passing the data to the inventory data loader 320. The inventory data loader 320 is responsible for receiving the data, correlating the data, and storing the data into a database on the SQL server. The sender services 322 are responsible for performing Site-to-site communications. The sender services, therefore, provide communication over various connections such as ISDN or X.25. It should be noted that only one instance of the scheduler 312, the despooler 314, the inventory processor 318, and the inventory data loader 320 are present within the site at any given time. However, more than one sender services 322 may be present within a site since the site may, in turn, be connected to other sites.

The secondary storage 306 contains a system map file 324 and a software directory structure 326. The system map file 324 lists the software that is stored on the site server 202 and the directories in which the software is stored. In addition, the system map file 324 indicates the specific edition of the software. An "edition" of software refers to a copy of the software that operates using a particular natural language and that is suitable for execution with a particular type of operating system on a particular type of processor. For example, an application program may have two editions, a first edition in German for use with OS/2 on an x86 processor and a second edition in English for use with "MICROSOFT WINDOWS NT" on an Alpha processor. More than one edition of the software is typically stored on the site server according to the natural language in which it is to operate, the operating system with which it is to operate and the platform (or processor) on which it is to execute. The various editions of the software are stored in the software directory structure 326. The software directory structure 326 is created upon installation of the centralized management system. When installing the centralized management system, a compact disk is inserted into the site server and as part of the installation process, the software directory structure 326 is created and the software contained on the compact disk is copied therein. The software directory structure 326 has a main directory "site.srv" with various directories of the main directory that each contain portions of an edition of the software that are natural language independent. That is, software usually comprises a number of flies ("portions"), some of which are natural language independent and others are natural language dependent. The natural language independent portions are stored in the directories and the natural language dependent portions are stored in subdirectories within the directories. An example of a service stored in the software directory structure 226 is depicted below in Table 2.

TABLE 2

```
..\site.srv
  \x86.bin
    servos2.exe
    servnt.exe
    serv.dll
    \00000409
      servlang.dll
    \00000407
      servlang.dll
  \mips.bin
    servnt.exe
    serv.dll
    \00000409
      servlang.dll
    \00000407
      servlang.dll
  \alpha.bin
    servnt.exe
    serv.dll
    \00000409
      servlang.dll
    \00000407
      servlang.dll
```

As can be seen from Table 2, the main directory site.srv has three directories \x86, \mips, and \alpha. Each directory contains software that is specific to a particular type of processor and within each directory are editions of the software for a particular operating system, such as "servos2.exe" for use with "OS/2" and "servnt.exe" for use with "MICROSOFT WINDOWS NT." Each directory then, in turn, has a subdirectory 00000409 and a subdirectory 00000407. Each of these numbers indicates a specific language code that refers to a natural language. For example, the number 00000407 indicates the German language and the number 00000409 indicates the English language. These subdirectories contain one or more portions of the edition of the software that are language dependent. Therefore, within the \x86 directory, servos2.exe, servnt.exe and serv.dll are language independent portions of the software that are suitable for execution on the X86 family of processors, with servos2.exe suitable for use with "OS/2" and servnt.exe suitable for use with "MICROSOFT WINDOWS NT." Further, subdirectories 00000409 and 00000407 of the \x86 directory contain the language dependent portions of the software that are suitable for execution on the X86 family of processors. Although the software for one service has been depicted, all of the other software that is available from the site server is stored in this manner. For example, with respect to an additional service, the \x86 directory would contain the language independent portions of the additional service that run on the X86 family of computers (with one edition for each operating system supported), and the subdirectories 00000409 and 00000407 would contain the language dependent portions of the additional service.

The configuration of the helper server is similar to that of the site server. That is, the helper server has similar hardware and software components to that of the site server, although one skilled in the art will appreciate that the helper server can have additional or different hardware or software components. However, the services used by the centralized management system do not typically run on the helper server unless they are specifically moved on to the helper server as is discussed below.

Figure 3B:
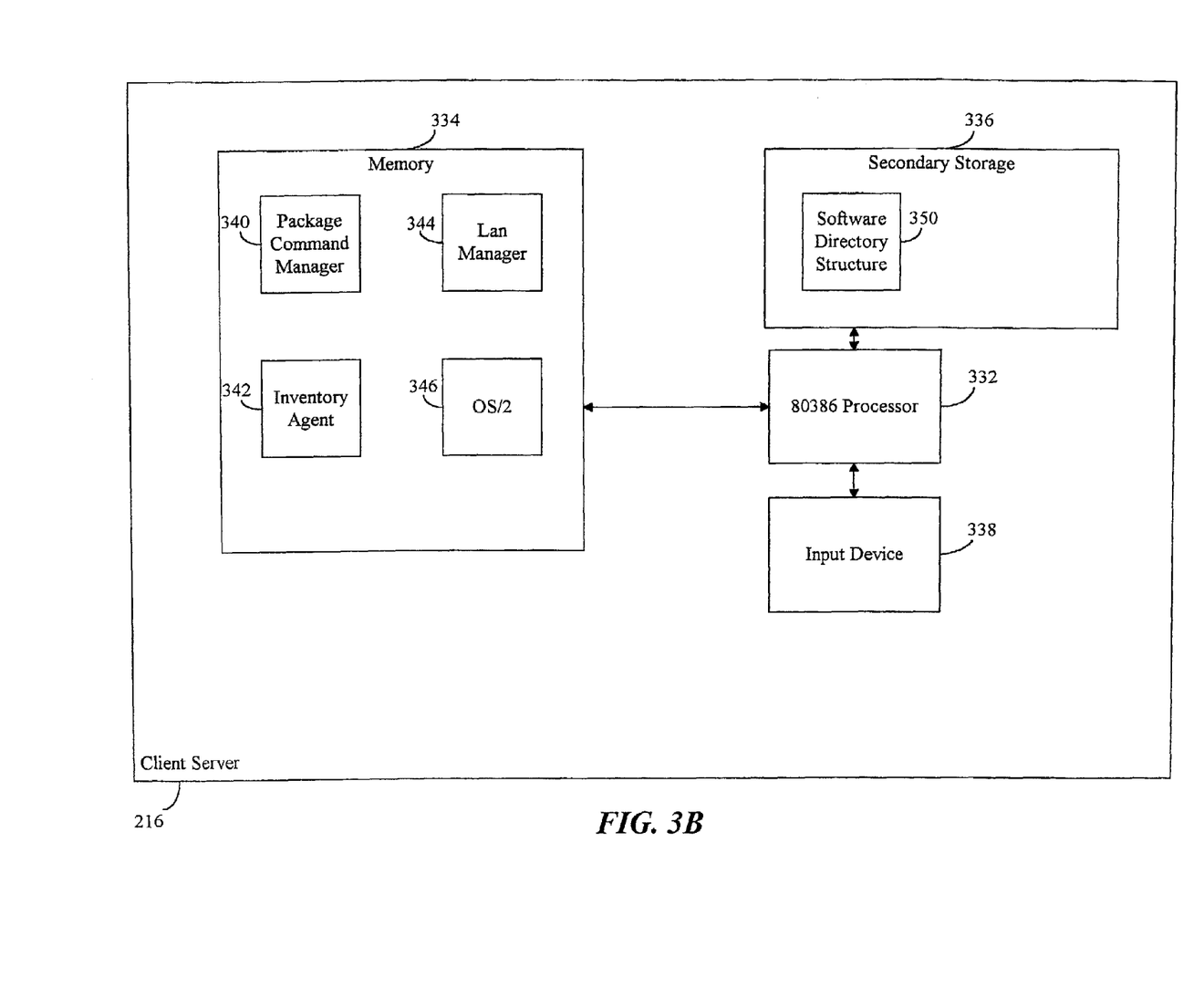
FIG. 3B depicts a more detailed block diagram of a client server of FIG. 2.

FIG. 3B depicts a more detailed block diagram of the client server 216 of FIG. 2. Although client server 216 is depicted, the other client server 212 is similarly configured. The client server 216 has an 80386 processor, a memory 334, a secondary storage device 336, and an input device 338, such as a keyboard. The memory 334 contains a network operating system such as "LAN MANAGER" 344 and an operating system such as IBM "OS/2" 346. It should be appreciated that the client server 216 can operate other combinations of network operating systems and operating systems. In addition, the memory 334 contains services that help provide the functionality of the centralized management system including the package command manager 340 and the inventory agent 342. The package command manager 340 provides the functionality of automatically installing application programs onto the client server 216. The inventory agent 342 provides the functionality of retrieving the hardware and software inventory of the client server 216 and sending this inventory information to the site server wherein the information is utilized by the inventory processor of the site server. The secondary storage device 336 contains a software directory structure 350 that stores the software that is associated with the centralized management system and that is currently installed on the client server 216. The layout of the software directory structure 350 is similar to that of the software directory structure described relative to the site server. One skilled in the art will appreciate that the client server may have additional or different components, such as a MIPS processor, an Alpha processor or a processor from the X86 family of processors.

As previously stated, the preferred embodiment of the present invention provides for the automatic installation of software on a heterogeneous computer. The preferred embodiment of the present invention performs this functionality within the context of the centralized management system described above. However, one skilled in the art will appreciate that the techniques used by the preferred embodiment of the present invention for automatically installing software can be utilized within other environments. The preferred embodiment of the present invention can be used to copy or move the services of the centralized management system located on the site server to a helper server in order to offload some of the processing of the site server. In addition, the preferred embodiment of the present invention monitors and automatically installs the services of the centralized management system on client servers.

Figure 4:
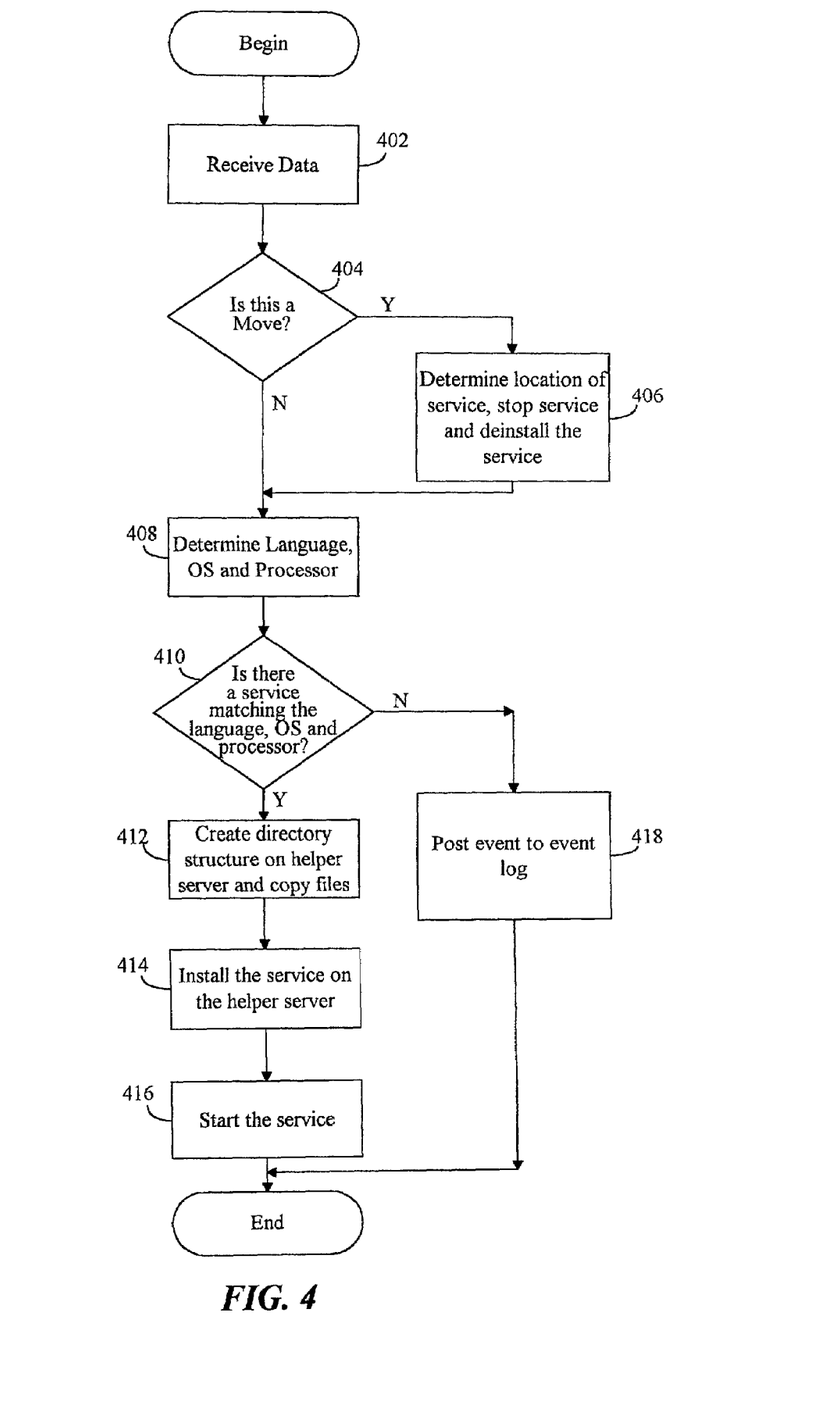
FIG. 4 depicts a flowchart of the steps performed by the preferred embodiment of the present invention when moving or copying a service to a helper server.

FIG. 4 depicts a flowchart of the steps performed by the preferred embodiment of the present invention when copying or moving services from the site server to a helper server. As previously stated, the administrator of the distributed system may determine to move a service or copy a service from the site server to a helper server in order to increase the performance of the site server. Also, once a service is on a helper server, the administrator may choose to move the service to a different helper server. In the preferred embodiment, the steps described below are performed by the site configuration manager. The first step performed by the site configuration manager is to receive data that indicates which service is to be moved or copied and the destination helper server (step 402). In this step, the administrator inputs the data into the administrator's console, which then sends the data to the site server. At the site server, the data is deposited into the database of the SQL server, wherein a change in the database is noticed by the system and the data is then sent to the site configuration manager for processing. The data received by the site configuration manager does not provide an indication of where the service is currently located. Therefore, the location of the service has to be determined in a later step. In other words, the service could be currently running on another helper server and an administrator may have decided to move the service from one helper server to another.

After receiving the data, the site configuration manager determines whether the requested action to be performed on the service is a move (step 404). If the service to be acted upon is the scheduler, the despooler, the inventory processor, or the inventory data loader, then it is assumed that a move is to occur since only one instance of these services can be running in the site at any given time. However, if the service to be acted upon is the sender services, it is assumed that the service is to be copied since more than one sender services can be running in the site at any given time. If it is determined that a move is to occur, the site configuration manager determines the location of the service, stops the service, and deinstalls the service (step 406) so that the service can be moved. In this step the site configuration manager determines the server ("source server") on which the service is currently located and the type of network operating system running on the source server by querying the NT registry.

The NT registry is a central repository in "MICROSOFT WINDOWS NT" for all information about the computer hardware, the computer software, and the users of the distributed system. The NT registry consists of a number of files, where each file corresponds to a discrete unit of registry information. Data in the registry is structured as a hierarchically structured tree, with each node of the tree referred to as a key. Each key can contain both subkeys and data. When accessing the data of a key, in some instances, the key can be referred to directly to access the data and, in other instances, a key must be opened before accessing the data associated with the key. When opening a key, the handle of another key must be supplied in the registry that is already open. The NT registry provides four standard handles that are always open and, thus, act as entry points to the registry. The first standard handle is HKEY_CLASSES_ROOT which provides information relating to classes of documents and properties associated therewith. The HKEY_CURRENT_USER standard handle contains environment variables that contain preferences of the user relating to the system environment such as the natural language. The HKEY_LOCAL_MACHINE standard handle contains configuration information of the system, including information about the bus type, system memory, operating system, processor, natural language and installed software. The HKEY_USERS standard handle contains configuration information of the local computer and user configuration information for the current user. The NT registry on the site server is used by the centralized management system to hold configuration information that indicates where a service is installed and a query to the NT registry can determine the source server and the type of network operating system that is running on the source server. Both of these queries are performed by the site configuration manager in this step.

After determining the type of the network operating system run on the source server, the site configuration manager stops the service and deinstalls the service using commands specific to the network operating system. If the server is running "MICROSOFT WINDOWS NT," the site configuration manager invokes the service control manager with various calls to perform this functionality. The service control manager maintains a database of installed services and status information pertaining to each service. Thus, the service control manager can control services on a particular computer. In addition, the service control manager automatically starts some services at operating system startup time. In utilizing the service control manager to stop and deinstall the service, the site configuration manager invokes the OpenSCManager call to gain access to the service control manager, the OpenService call to receive a handle to the service, the ControlService call to stop the service, the DeleteService call to deinstall the service and the CloseServiceHandle to close the service control manager. If the server is running either the "LAN MANAGER" or the "LAN SERVER" network operating system, the site configuration manager issues a NetServiceControl command, which provides access to the service on the source server to stop the service and then deinstalls the service. In deinstalling the service, the site configuration manager edits the "lanman.ini" file that is located on the source server to delete the entry referring to the service name and its location if the server is running the "LAN MANAGER" network operating system. The lanman.ini file contains various configuration information, such as a list of services that are currently installed. If the server is running the "LAN SERVER" network operating system, the site configuration manager edits the "lanman.ini" file that is located on the source server to delete the entry referring to the service name and its location. The ibmlan.ini file serves a similar purpose to that of the lanman.ini file.

If it is determined that a copy is to occur or after deinstalling the service, the site configuration manager determines the natural language, the type of the operating system and the type of the processor of the destination helper server (step 408). To determine the natural language utilized by the destination helper server, the site configuration manager queries the NT registry of the source server. The NT registry contains a key that indicates the natural language. This key is located at HKEY_LOCAL_MACHINE\System\CurrentControlSet\Control\NLS\Language\Default. The NT registry calls used to gain access to this key include RegConnectRegistry to establish a connection to a standard key on another computer, RegOpenKeyEx to open the key, RegQueryValueEx to retrieve the data of the key and RegCloseKey to close the key. The site configuration manager determines the type of the operating system running on the destination helper server by invoking the NetServerGetInfo "MICROSOFT WINDOWS NT" call, which returns information about a remote computer and therefore can return an indication of whether the destination helper server is running either "OS/2" or "MICROSOFT WINDOWS NT." In order to determine the type of processor of the destination helper server, the site configuration manager utilizes a CPU identifier that is found in a key of the NT registry at HKEY_

LOCAL_MACHINE\Hardware\Description\System\Central Processor\0\Identifier. In order to gain access to the CPU identifier, the site configuration manager invokes the following calls: RegConnectRegistry, RegOpenKeyEx, RegQueryValueEx, and RegCloseKey. After receiving the CPU identifier from the NT registry, the site configuration manager accesses tables contained within the system map file to map the CPU identifier to one of the supported processor types.

After determining the natural language, the operating system and the processor of the destination helper server, the site configuration manager determines if there is an edition of the service matching this natural language, operating system type and processor type (step 410). This step is performed by checking the system map file which, as previously stated, contains a list of all of the software that is available on the site server and the editions of the software that are available in terms of the processor on which the software can execute, the operating system with which the software can execute and the natural language in which it can operate. If it is determined that there is not an edition of the service matching the natural language, the operating system and the processor of the destination helper server, the site configuration manager will post an event to an event log (step 418), and processing ends. The event log is maintained by the site server and is accessible by the administrator. Thus, when an event is posted in the event log, the administrator is notified.

If there is a matching service, the site configuration manager creates the directory structure on the helper server and copies the files to the destination helper server (step 412). In this step, the site configuration manager creates a directory structure similar to that as described with reference to the site server except that the main directory is named "helper.srv." Therefore, for example, if an edition of the scheduler were moved to the destination helper server that was suitable for use with "OS/2" and suitable for execution on the X86 family of processors, a directory of \x86bin would be created and if the natural language were German, a subdirectory within the x86.bin directory would be created and named 00000407. Further, in copying the edition of the scheduler for the X86 family of processors, the language independent portions of the edition of the scheduler that are appropriate for use with "OS/2" would be copied into the x86.bin directory and the language dependent portions of the edition of the software would be copied to the German subdirectory. After creating the directory structure and copying the files, the site configuration manager installs the service on the destination helper server (step 414). If the destination helper server is running the "MICROSOFT WINDOWS NT" network operating system, the site configuration manager invokes the following calls to the service control manager to install the service: OpenSCManager to gain access to the service control manager, CreateService to add the service to the database of installed services, and CloseServiceHandle to close the service control manager. If the destination helper server is running the "LAN MANAGER" network operating system, the site configuration manager edits the lanman.ini file and adds an entry under the services section of the file in the form "service name=path-to-exe." If the destination helper server is running the "LAN SERVER" network operating system, the site configuration manager adds an entry into the services section of the ibmlan.ini file of the same form. After installing the service, the site configuration manager starts the service (step 416). In this step, the site configuration manager launches the service to run as a background task on the destination helper server. If the destination helper server is running the "MICROSOFT WINDOWS NT" network operating system, the site configuration manager invokes the following calls to the service control manager: OpenSCManager, OpenService, StartService to launch the service and CloseServiceHandle. If the destination helper server is running either the "LAN MANAGER" or the "LAN SERVER" network operating system, the site configuration manager invokes the NetServiceInstall command to launch the service.

With respect to the services running on the client server, the preferred embodiment of the present invention provides functionality that performs software upgrades to services that are installed, as well as provides functionality that monitors the services. The monitoring performed by the preferred embodiment of the present invention detects if a service stops running and will restart the service if necessary. In addition, the monitoring performed by the preferred embodiment detects a new client server that has been added to the distributed system and automatically installs the appropriate services onto the new client server. The services that are installed on the new client server are installed according to the preferences of the administrator. That is, the administrator has given preferences as to which services should be installed on the client servers of a particular domain, and the preferred embodiment of the present invention installs the services according to the preferences of the administrator. Therefore, the administrator can choose to have either the package command manager or the inventory agent installed or both.

Figure 5:
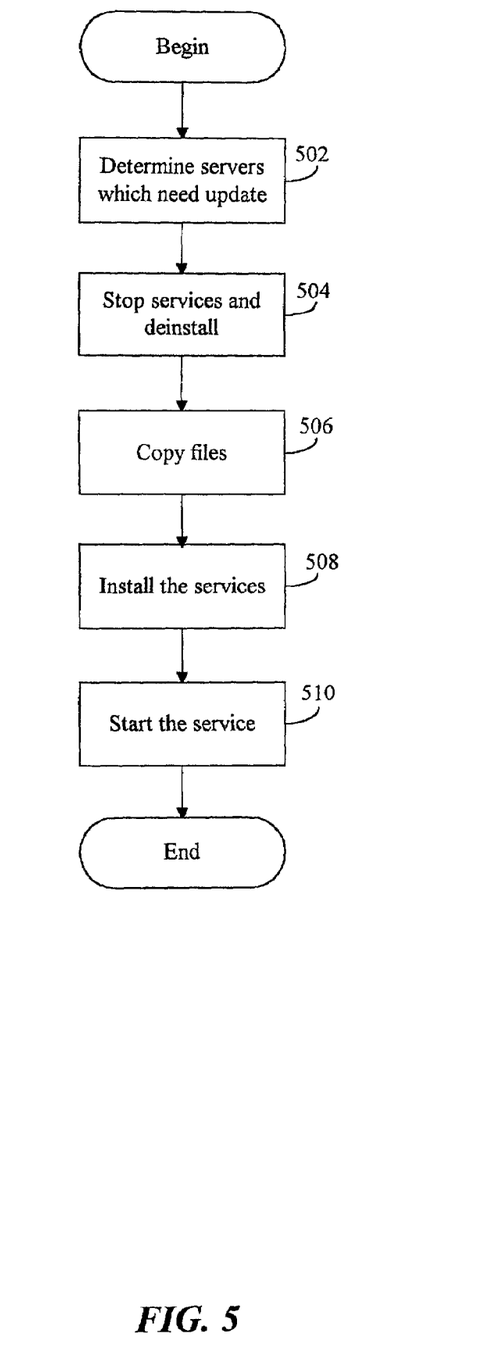
FIG. 5 depicts a flowchart of the steps performed by the preferred embodiment of the present invention when a new or revised version of a service on a client server becomes available.

FIG. 5 depicts a flowchart of the steps performed by the preferred embodiment of the present invention when performing a service upgrade. This processing is invoked when a new version of a service is available or when a revised version of a service is available, which typically occurs when a bug fix occurs. In the preferred embodiment, the steps described below are performed by the site configuration manager. The first step performed by the site configuration manager in upgrading a service on the client servers is to determine the client servers which need updating (step 502). In this step, the site configuration manager has stored locally a list of all client servers within a particular domain, as well as a list of each service that is installed on each client server. The list of client servers is stored as part of the processing associated with step 602 of FIG. 6, where the site configuration manager invokes the NetServerEnum call of "MICROSOFT WINDOWS NT" to retrieve the list of client servers. The services on each client server is known by the site configuration manager, since it is the site configuration manager that is responsible for installing the services. Both the list of client servers as well as the list of services on each client is stored in the NT registry at key HKEY_LOCAL_MACHINE\Software\Microsoft\SMS.

After determining which client servers have services that need updating, the site configuration manager stops the services on these client servers and deinstalls the services (step 504). The processing of this step is similar to that as described relative to step 406 of FIG. 4 with reference to the stopping of a service and the deinstallation of a service. After stopping and deinstalling the service, the site configuration manager copies the files representing the updated software to the client servers (step 506). In this step, the files are copied from the directory structure of the site server to the directory structure of the client servers. Since the directory structures were already in existence on the client servers, no modification or changes to the directory structures need to occur. After copying the files, the site configuration manager installs the services (step 508). The installation of the services is performed similar to that as described relative to step 414 of FIG. 4. After installing the services, the site configuration manager starts the services on the client servers (step 510). The processing performed for this step is similar to that as described relative to step 416 of FIG. 4.

Figure 6:
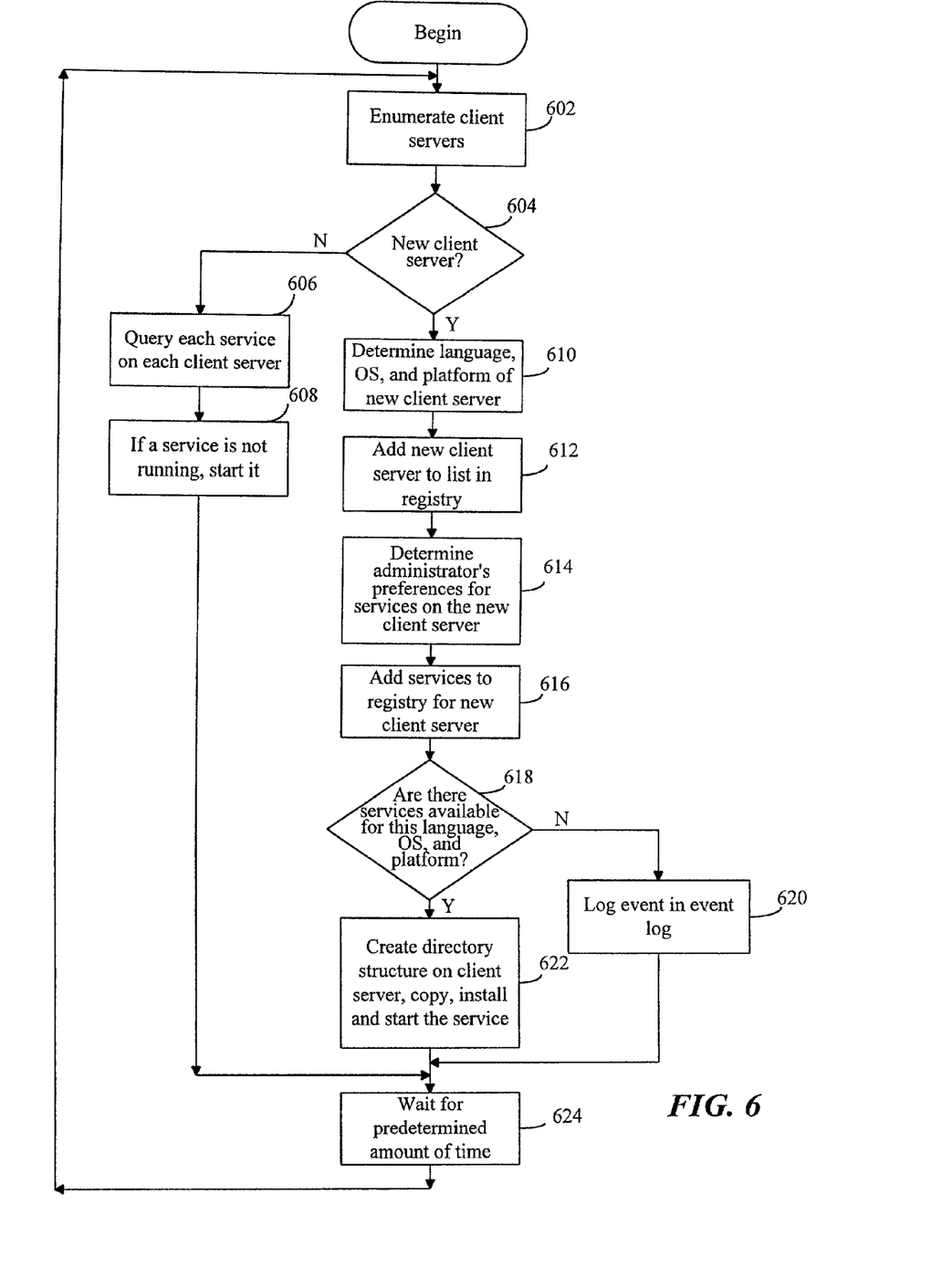
FIG. 6 depicts a flowchart of the steps performed by the preferred embodiment of the present invention when monitoring client servers.

FIG. 6 depicts a flowchart of the steps performed by the preferred embodiment of the present invention for monitoring client servers. In the preferred embodiment, the steps below are performed by the site configuration manager. In monitoring the client servers, the site configuration manager determines whether a service has terminated execution on the client servers and, if so, the site configuration manager restarts the service. In addition, the Site configuration manager determines if a new client server has been added to the site and, upon determining that a new client server has been added to the site, the site configuration manager automatically installs the appropriate services onto the new client server according to the preferences of the administrator. The first step performed by the site configuration manager in monitoring the client servers is to enumerate all servers for one or more domains that the site server is managing (step 602). In this step, the site configuration manager invokes the "NetServerEnum" call of "MICROSOFT WINDOWS NT." After enumerating the client servers, the site configuration manager determines if a new client server has been added to the site (step 604). In this step, the site configuration manager compares the list of client servers retrieved in step 602 against the list of client servers stored in the NT registry at key HKEY_LOCAL_MACHINE\Software\Microsoft\ SMS, which contains a list of client servers that was current as of the last time that step 602 was invoked. If it is determined that a new client server has not been added to the site, the site configuration manager queries each service on each client server to determine if it is running (step 606). In this step, the site configuration manager determines if a service is running on a client server that utilizes "MICROSOFT WINDOWS NT" by utilizing the service control manager with the following calls: OpenSCManager, OpenService, QueryServiceStatus to return the current status of the service, and CloseServiceHandle. The site configuration manager determines if a service is running on a client server that utilizes either the "LAN MANAGER" or the "LAN SERVER" network operating system by invoking the NetServiceGetInfo call. After querying each service, if a service is found to not be running, the site configuration manager starts the service (step 608). The site configuration manager starts the service as previously described relative to step 416 of FIG. 4. Processing then continues to step 624.

If a new client server is detected, the site configuration manager determines the natural language, the operating system type, and the processor type of the new client server (step 610). The processing of this step is similar to that as described relative to step 408 of FIG. 4. After making this determination, the site configuration manager adds the new client server to the list of client servers in the NT registry (step 612). As previously described, a list of client servers is stored in the NT registry and in this step, the site configuration manager adds the new client server to the list of client servers in the NT registry. After adding the new client server to the NT registry, the site configuration manager determines the administrator's preferences for services to be installed on the client server (step 614). The preferences of the administrator are stored in the system map file. After determining the administrator's preferences, the site configuration manager adds the preferred services of the administrator to the registry for the new client server (step 616). As previously described, the NT registry contains a list of services for each client server. In this step, the site configuration manager adds the preferred services of the administrator to a list of services for the new client server that is stored in the NT registry. After adding the services to the NT registry, the site configuration manager determines if there are editions of services available for the natural language, the type of operating system and the type of processor of the new client server (step 618). In this step, the site configuration manager accesses the system map file, which has an indication of all the editions of software on the site server. If there is an edition of the services available, the site configuration manager creates a directory structure on the client server, copies the files to the client server, installs the services and starts the services (step 622). The processing of this step is similar to that as described relative to steps 412–416 of FIG. 4. If there are no editions of the services that match the natural language, operating system type and processor type of the new client server, the site configuration manager logs an event in the event log (step 620). The processing of this step is similar to that described relative to step 418 of FIG. 4. Next, the site configuration manager waits for a predetermined amount of time (step 624) and continues processing to step 602. The predetermined amount of time is configurable by the administrator to various settings. The settings utilized by the preferred embodiment include 24 minutes, 2 hours, 6 hours, and 12 hours. Therefore, the administrator has the ability to set the predetermined amount of time so as to least interrupt the processing of the centralized management system, or when significant problems are occurring, the administrator can set the predetermined period of time so that monitoring of the client servers occurs more frequently.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A data processing system having software for installation, comprising:
    a first computer configured to receive the software, the first computer being newly added to the data processing system; and
    a second computer configured to automatically determine when the first computer is newly added to the data processing system by comparing a list of computers being managed by the second computer to a previously generated list of computers being managed by the second computer, the second computer being configured to automatically install the software onto the first computer in response to the second computer determining that the first computer is newly added to the data processing system and such that the first computer functions as a server in a distributed data processing system and when it is determined to install the software onto the first computer wherein the second computer is heterogeneous with respect to the first computer.

2. The data processing system of claim 1, wherein the software is a version of a program, and wherein the second computer includes a detection component for detecting when the version of the program is outdated and for installing a new version of the program onto the first computer.

3. The data processing system of claim 1, wherein the first computer has an associated first language and wherein the second computer has an associated second natural language.

4. The data processing system of claim 1, wherein the first computer executes an operating system of a first type and wherein the second computer executes an operating system of a second type.

5. The data processing system of claim 1, wherein the first computer has a processor of a first type and wherein the second computer has a processor of a second type.

6. The data processing system of claim 1, wherein the first computer executes a network operating system of a first type and wherein the second computer executes a network operating system of a second type.

7. An automatic software installation system, comprising:
a first computer having an associated natural language and a processor running an operating system, the first computer being newly added to the data processing system; and
a second computer, heterogeneous with respect to the first computer, having a first component configured to store editions of software, a second component configured to automatically determine the natural language associated with the first computer, the operating system running on the first computer and the type of processor in the first computer and a third component configured to control installation of one edition of the software onto the first computer that is particular to the type of processor in the first computer, the operating system running on the first computer and the natural language associated with the first computer, wherein the second computer installs the edition of the software by utilizing commands that are suitable for the operating system running on the first computer, wherein the second computer comprises a detection component configured to detect that the first computer is newly added by comparing a list of computers being managed by the second computer and to automatically install the edition of the software in response to detecting that the first computer is newly added and such that the first computer functions as a server in a distributed data processing system.

8. The automatic software installation system as recited in claim 7, wherein the second computer is configured to start the software.

9. The automatic software installation system as recited in claim 7, wherein the first computer is associated with a first site and the second computer is associated with a second site.

10. The automatic software installation system as recited in claim 9, wherein the second computer manages the second site.

11. The automatic software installation system as recited in claim 7, wherein the second computer comprises a helper server, the helper server being configured to install the software on the first computer.

12. An automatic software installation system comprising:
a first computer configured to receive one or more application programs, the first computer forming part of a first site comprising a plurality of computers connected together by a first area network;
a second computer associated with a second site comprising a plurality of computers connected together by a second area network, the second computer being configured to store the one or more application programs and manage the delivery of the one or more software to the first computer by automatically determining when the first computer is newly added to the data processing system by comparing a list of computers being managed by the second computer to a previously generated list of computers being managed by the second computer and controlling the automatic installation of the software onto the first computer when it is determined by the second computer that the first computer is newly added to the data processing system and such that the first computer functions as a server in a distribution data processing system.

13. The automatic software installation system as recited in claim 12, wherein the second computer is configured to start the software.

14. The automatic software installation system as recited in claim 12, wherein the second computer comprises a helper server, the helper server being configured to install the software on the first computer.

15. The automatic software installation system as recited in claim 12, wherein the second computer comprises a detection component configured to detect the first computer.

16. The automatic software installation system as recited in claim 12, wherein the first computer has an associated first natural language and wherein the second computer has an associated natural language.

17. The automatic software installation system as recited in claim 12, wherein the first computer executes an operating system of a first type and wherein the second computer executes an operating system of a second type.

18. The automatic software installation system as recited in claim 12, wherein the first computer has a processor of a first type and wherein the second computer has a processor of a second type.

19. The automatic software installation system as recited in claim 12, wherein the first computer executes a network operating system of a first type and wherein the second computer executes a network operating system of a second type.

20. In a data processing system having software for installation a method for installing software onto a computer, the method comprising the acts of:
automatically determining when a first computer is newly added to the data processing system by comparing a list of computers being managed to a previously generated list of computers being managed, the first computer comprising a natural language and a processor running an operating system;
identifying a stored edition of software, at a second computer, that is particular to the natural language, the processor, and the functioning operating system of the first computer;
identifying stored preferences controlling installing the stored edition of the software onto the first computer; and
automatically installing only the edition of the software onto the first computer, directly from the second computer, utilizing commands that are suitable for the functioning operating system running on the first computer and based upon the stored preferences in response to automatically determining when the first computer is newly added to the data processing system and such that the first computer functions as a server in a distributed data processing system.

21. A method as recited in claim 20, further comprising, automatically starting, by the second computer, the installed edition of the software on the first computer.

22. A method as recited in claim 20, further comprising delivering the edition of the software to a third computer, the third computer installing only the edition of the software onto the first computer directly from the third computer utilizing commands that are suitable for the operating system running on the first computer and based upon the stored preferences.

23. A method as recited in claim 20, wherein determining when the first computer is added to the data processing system occurs periodically.

24. A method as recited in claim 20, wherein determining when the first computer is added to the data processing system occurs in accordance with a predetermined amount of time set by an administrator of the data processing system.

25. A method as recited in claim 20, wherein determining when the first computer is added to the data processing system occurs in accordance with an instruction of an administrator.

26. In a data processing system having software for installation a method for installing software onto a first computer, the method comprising:
 a step for determining, remote from the first computer, when the first computer is newly added to the data processing system by comparing a list of computer being managed to a previously generated list of computers being managed,the first computer comprising a natural language and a processor running a functioning operating system;
 a step for receiving at the first computer an edition of software that is particular to the natural language, the processor, and the operating system of the first computer;
 a step for automatically installing onto the first computer only the edition of the software, under the control of a second computer, utilizing commands that are suitable for the operating system running on the first computer in response to determining when the first computer is newly added to the data processing system and such that the first computer functions as a server in a distributed data processing system.

27. A computer program product for implementing, in an automatic software installation system, a method for installing software onto a first computer, the computer program product comprising:
 a computer readable medium carrying computer executable instructions for implementing the method, the computer executable instructions, when executed, performing the acts of:
  automatically determining when a first computer is newly added to the data processing system, by comparing a list of computers being managed to a previously generated list of computers being managed, the first computer comprising a natural language and a processor running an operating system;
  identifying a stored edition of software, at a second computer, that is particular to the natural language, the processor, and the operating system of the first computer
  identifying stored preferences controlling installing the stored edition of software onto the first computer; and
  automatically installing only the edition of the software onto the first computer directly from the second computer utilizing commands that are suitable for the operating system running on the first computer and based upon the stored preferences in response to determining when the first computer is newly added to the data processing system and such that the first computer functions as a server in a distribution data processing system.

28. A computer program product as defined in claim 27, wherein the computer readable medium further carries computer executable instructions for performing the act of automatically starting, by the second computer, the installed edition of the software on the first computer.

29. A computer program product as defined in claim 27, wherein the computer readable medium further carries computer executable instructions for performing the act of delivering the edition of the software to a third computer, the third computer installing only the edition of the software onto the first computer directly from the third computer utilizing commands that are suitable for the operating system running on the first computer and based upon the stored preferences.

30. A computer program product as defined in claim 27, wherein the computer readable medium further carries computer executable instructions for performing the act of periodically determining when the first computer is added to the data processing system.

31. A computer program product as defined in claim 27, wherein the computer readable medium further carries computer executable instructions for performing the act of determining when the first computer is added to the data processing system in accordance with a predetermined time set by an administrator of the data processing system.

32. A computer program product as defined in claim 27, wherein the computer readable medium further carries computer executable instructions for performing the act of determining when the first computer is added to the data processing system in accordance with an instruction of an administrator.

33. The data processing system of claim 1, wherein the data processing system is the distributed data processing system and the first computer functions as a distributed server to increase the performance of the data processing system by having a service copied or moved from the second computer system to the first computer system.

* * * * *